United States Patent
Pahuja

(10) Patent No.: US 9,621,213 B2
(45) Date of Patent: Apr. 11, 2017

(54) SMART CARD BATTERY CHARGING DURING CARD USE

(71) Applicant: PAYPAL, INC., San Jose, CA (US)

(72) Inventor: Anupam Pahuja, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/757,705

(22) Filed: Dec. 23, 2015

(65) Prior Publication Data

US 2016/0294426 A1    Oct. 6, 2016

Related U.S. Application Data

(60) Provisional application No. 62/140,707, filed on Mar. 31, 2015.

(51) Int. Cl.
*H04W 52/02* (2009.01)
*H04B 1/3883* (2015.01)
*H04L 12/26* (2006.01)

(52) U.S. Cl.
CPC ........... *H04B 1/3883* (2013.01); *H04L 43/16* (2013.01); *H04W 52/0267* (2013.01)

(58) Field of Classification Search
None
See application file for complete search history.

(56) References Cited

U.S. PATENT DOCUMENTS

| | | | | |
|---|---|---|---|---|
| 5,978,236 A * | 11/1999 | Faberman | ............... | H02J 9/061 307/66 |
| 6,943,529 B2 * | 9/2005 | Cheiky | ................ | H02J 7/0016 320/137 |
| 7,439,704 B2 * | 10/2008 | Nojima | ................... | H02M 7/48 318/442 |
| 8,035,354 B2 * | 10/2011 | Van Der Velden | ... | H02J 7/0068 320/128 |
| 2004/0068656 A1 | 4/2004 | Lu | | |
| 2008/0054721 A1 | 3/2008 | Frew et al. | | |
| 2009/0240625 A1 | 9/2009 | Faith et al. | | |

(Continued)

OTHER PUBLICATIONS

International Standard, ISO/IEC 7816-3, Part 3—Identification cards—Integrated circuit cards—Cards with contacts—Electrical interface and transmission protocols, Third edition, Nov. 1, 2006, 56 pages.

(Continued)

*Primary Examiner* — Diane Mizrahi
(74) *Attorney, Agent, or Firm* — Haynes and Boone, LLP

(57) ABSTRACT

Systems, methods, and computer program products are disclosed for dynamically charging an internal battery of a smart card from an interface device (such as a terminal) so that the battery life may be extended. A smart card device detects that it has interfaced with an interface device and that voltage is now being provided to the smart card device. The smart card device may divert some or most of the current being provided with the voltage to charge an internal battery of the smart card device, either concurrent to other communications between the smart card device and the interface device or before/after relevant communications are completed. As a result, the use of a smart card device contributes to the charge of the smart card device's internal battery, instead of draining it.

19 Claims, 6 Drawing Sheets

(56) References Cited

U.S. PATENT DOCUMENTS

2013/0334881 A1* 12/2013 Jones .................. H02J 4/00
    307/23
2014/0346236 A1    11/2014 Kargl et al.
2015/0058213 A1     2/2015 Lee Kim-Koon et al.
2016/0004945 A1     1/2016 Wade

OTHER PUBLICATIONS

International Standard, ISO/IEC 7816-2, Part 2—Identification cards—Integrated circuit cards—Cards with contacts—Dimensions and location of the contacts, Second edition, Oct. 12, 2007, 13 pages.
International Search Report dated Jul. 12, 2016 issued in connection with Application No. PCT/US16/25087; 15 pp.

* cited by examiner

SMART CARD BATTERY CHARGING DURING CARD USE

CROSS-REFERENCE TO RELATED APPLICATIONS

The present application claims priority to and the benefit of the U.S. Provisional Patent Application No. 62/140,707, filed Mar. 31, 2015, which is hereby incorporated by reference in its entirety.

BACKGROUND

Field of the Invention

The present disclosure generally relates to smart cards with built-in electronics, and more particularly to the dynamic charging of a smart card's battery during card use.

Related Art

Smart cards include a processor embedded in the card, which stores encrypted data. A common processor is an EMV (Euro, Mastercard, Visa) integrated circuit ("EMV chip"). However these smart cards generally do not have an embedded battery source. Instead, when the smart card is inserted into an interface device (such as an EMV reader), the contacts on the EMV chip make contact with the connectors on the EMV reader. The EMV reader, which has a power source, supplies power to the EMV chip and then reads the data embedded in the chip. Looking forward, however, as more electronics are embedded within smart cards, the need is increasing to have a power source incorporated within the smart card.

International standards may define physical characteristics for smart cards. One standard dictates that all cards have a specified thickness (e.g., 0.76 mm (0.030 in)). Given the size limitations of the smart cards, it is not possible to embed large power sources (such as large batteries) in the smart cards. With ever-increasing electronics and specified size constraints, the battery life of the smart card becomes a bottleneck. This bottleneck leads to frequent re-charging of the battery and a corresponding inconvenience to the user and lack of utility for the smart card, since continued use of the smart card with integrated battery would require the user to also carry a charger for the smart card, so as to retain use and utility of the smart card.

Figure 1:
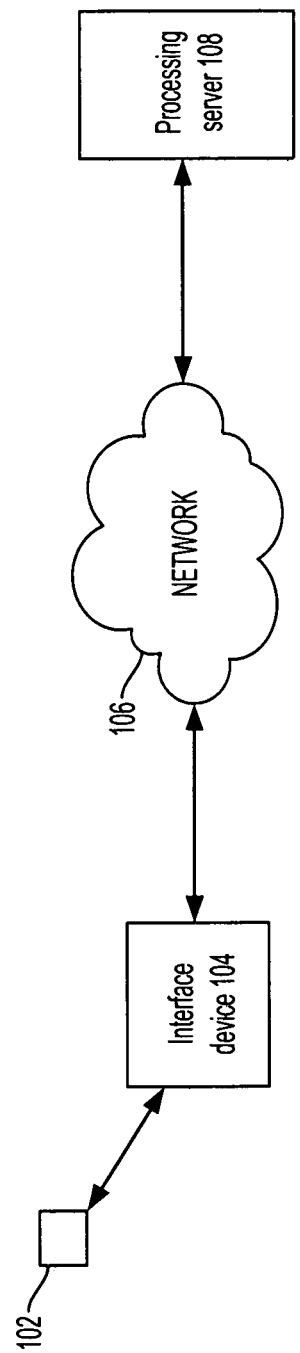
FIG. 1 is a diagram of an exemplary networked system environment according to embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The present disclosure provides systems, methods, and computer program products for dynamically charging the internal battery of a smart card from an interface device (such as a point of sale terminal) so that the battery life of the smart card may be extended. In an embodiment, a smart card device detects that it has interfaced with an interface device (either via contact or contactless mechanisms) and that voltage is now being provided to the elements of the smart card device. The smart card device may divert some or most of the current being provided with the voltage to charge an internal battery of the smart card device, either concurrent to other communications between the smart card device and the interface device or before/after relevant communications are completed.

In an embodiment, the smart card device may detect whether the interface device is a charging terminal prearranged to be able to charge the smart card device or a point of sale terminal/EMV reader. The smart card device may make this detection based on whether a signal is asserted or not on a proprietary contact of the smart card device by the interface device. If the signal is asserted, the smart card device may determine that the interface device is prearranged to charge the smart card device such that no additional regulation of the voltage is necessary before providing it to the battery. If the signal is not asserted, the smart card device may determine to route the input voltage through regulation first so that, no matter the level of the input voltage, the voltage to the battery is suitable to charge the battery.

As a result of the above embodiments, the use of a smart card device in transactions (or insertion into a charging terminal) contributes to the charge of the smart card device's internal battery, instead of draining it. As a result, the useful life of the smart card device is actually extended when the smart card device's use is increased, instead of diminishing the useful life. This permits the smart card device to remain in circulation for much longer periods of time, increasing convenience to the user and decreasing cost to the smart card provider. Further, embodiments of the present disclosure reduces the need for carrying a charger with the smart card device; the more a smart card device is inserted into an interface device for some type of transaction, the more the smart card device's battery is charged. In other words, more usage of the smart card device may result in a more charged battery rather than less charged battery.

Referring now to FIG. 1, an embodiment of an exemplary networked system environment 100 is illustrated. The networked system environment 100 may include one or more smart card devices 102 (referred to also herein as a smart card, a smart payment card, etc. for example), one or more interface devices 104, one or more networks 106, and one or more processing servers 108. As will be recognized, the networked system environment 100 illustrated in FIG. 1 is simplified for sake of illustration.

The networked system environment 100 may support operation on multiple networks and platforms (e.g., payment platforms). Other environments than the one illustrated are also within the scope of the present disclosure, as will be recognized.

The networked system environment 100 includes one or more smart card devices 102, illustrated in FIG. 1 as a single smart card device 102. Although illustrated as one smart card device 102, it will be recognized that the networked system environment 100 may include/interact with any number of smart card devices 102 without departing from the scope of the present disclosure.

Figure 2:
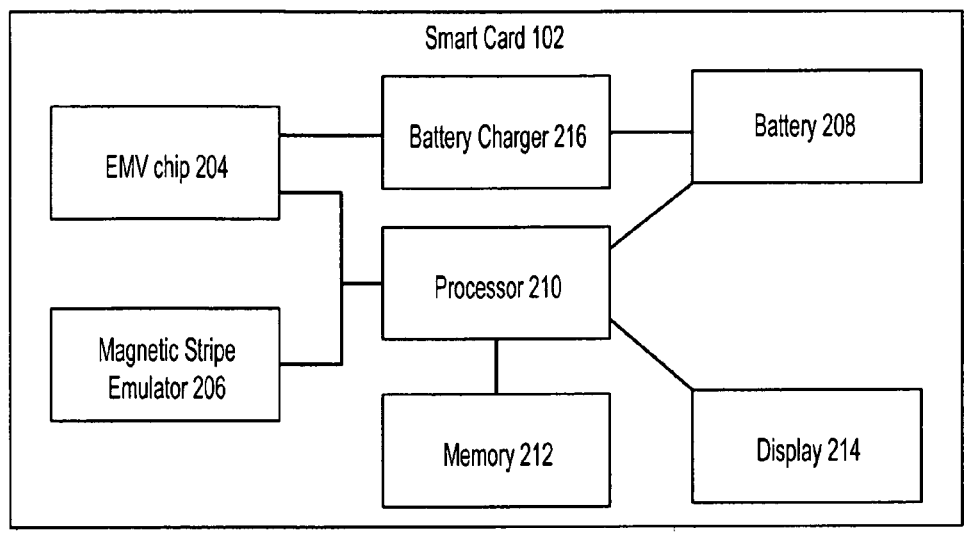
FIG. 2 is a block diagram of an exemplary smart card device according to embodiments of the present disclosure.

One exemplary embodiment of the smart card device 102 is depicted in FIG. 2. In FIG. 2, the smart card device 102 includes an EMV chip 204, a magnetic stripe emulator 206, a battery 208, a processor 210, a memory 212, a display 214, and a battery charger 216. These elements may be in direct or indirect communication with each other, for example via one or more buses.

Figure 3:
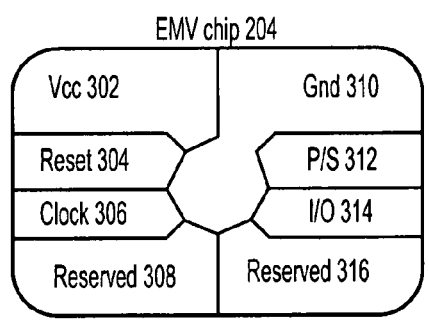
FIG. 3 is a block diagram of an aspect of an exemplary smart card device according to embodiments of the present disclosure.

The EMV chip 204 may include a plurality of interface contacts, for example as illustrated in FIG. 3. These interface contacts may include a Vcc (input voltage) contact 302, a reset contact 304, a clock contact 306, a reserved (for future use) contact 308, a ground contact 310, a proprietary/standard contact 312 (formerly used as a Vpp contact, though now deprecated for that use), an input/output contact 314, and another reserved (for future use) contact 316. The contacts illustrated in FIG. 3 of the EMV chip 204 may be, for example, contacts whose physical and operational characteristics are as described in detail in the ISO 7816 standards, which are incorporated by reference in their entirety.

For example, the ISO 7816-2 standard describes how an interfacing device 104 (e.g., an EMV reader) reads data from a smart card device 102. Normally, six of the contacts illustrated in FIG. 3 are used for communications. For example, the Vcc contact 302 may be used to supply power to the smart card device 102. Reset contact 304 may be used to reset the smart card device 102, alone or in a combination of signals at one or more contacts. The clock contact 306 may provide a clock input to the smart card device 102 during a data input/output session. The input/output contact 314 may be used for serial data communication between the smart card device 102 and the interface device 104. In an embodiment, communication between the smart card device 102 and the interface device 104 is a half-duplex communication. Ground contact 310 may be a Ground pin. The reserved contact 308 (referred to as C4 in the ISO 7816 standards, for example) and the reserved contact 316 (referred to as C8 in the ISO 7816 standards, for example) may be reserved for future use, e.g. either according to a standard use or proprietary use.

With respect to the proprietary/standard contact 312, according to ISO 7816-3 (2006), this contact was amended in 2006 to deprecate its use for Vpp (provision of a programming voltage input to the smart card device 102) and now may be available as a proprietary contact. ISO 7816 is used as just one example of a standard available with respect to contacts associated with the smart card device 102 of the figures herein. While the battery 208 of the smart card device 102 may be charged through any standard, many smart cards in the world today are EMV smart cards and, therefore, many examples herein describe how an EMV reader (an example of the interface device 104), which uses ISO 7816 standards, may charge the battery 208 of the smart card device 102.

Returning again to FIG. 2, the magnetic stripe emulator 206 may include an actual magnetic stripe on the back of the smart card device 102 (e.g., a combination of the EMV chip 204 and a magnetic stripe for backwards compatibility at given merchants). Alternatively, the magnetic stripe emulator 206 may include elements that enable the smart card device 102 to emulate the functionality of a magnetic stripe (e.g., protocols, values, etc.).

The battery 208 may be any appropriately-sized battery (or other power source), such as a button cell battery to name an example. Generally, the battery 208 may be any power source capable of providing sufficient current to power the components of the smart card device 102.

The processor 210 may include a microcontroller, a central processing unit (CPU), an application-specific integrated circuit (ASIC), a controller, a field programmable gate array (FPGA) device, another hardware device, a firmware device, or any combination thereof configured to perform the operations described herein and discussed in more detail below. The processor 210 may also be implemented as a combination of computing devices, e.g., a plurality of microprocessors/microcontrollers, or any other such configuration. The processor 210 may be a single processor or multiple processors, where each processor may have one or more processing cores capable of parallel and/or sequential operation.

The memory 212 may include a cache memory (e.g., a cache memory of the processor 210), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, other forms of volatile and non-volatile memory, or a combination of different types of memory. In an embodiment, the memory 304 includes a non-transitory computer-readable medium. The memory 212 may store instructions that, when executed by the processor 210, cause the processor 210 to perform the operations described herein in connection with embodiments of the present disclosure. Instructions may also be referred to as code. The terms "instructions" and "code" include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The display 214 may be included with the smart card device 102 according to embodiments of the present disclosure, and not included in other embodiments. Where included, the display 214 may take a small area on the card and use, for example, electronic ink (e-ink) that consumes a low amount of battery power. The display 214 may be used, for example, to display a one-time password, balance information, rewards points updated information, and/or battery status information (e.g., a percentage of battery life remaining), to name some examples. The display 214 may include an input component in addition to the output component. For example, the display 214 may include one or more touch points (e.g., capacitive or otherwise) that respond to touches on the card at those points to input data or requests from the user.

Figure 5:
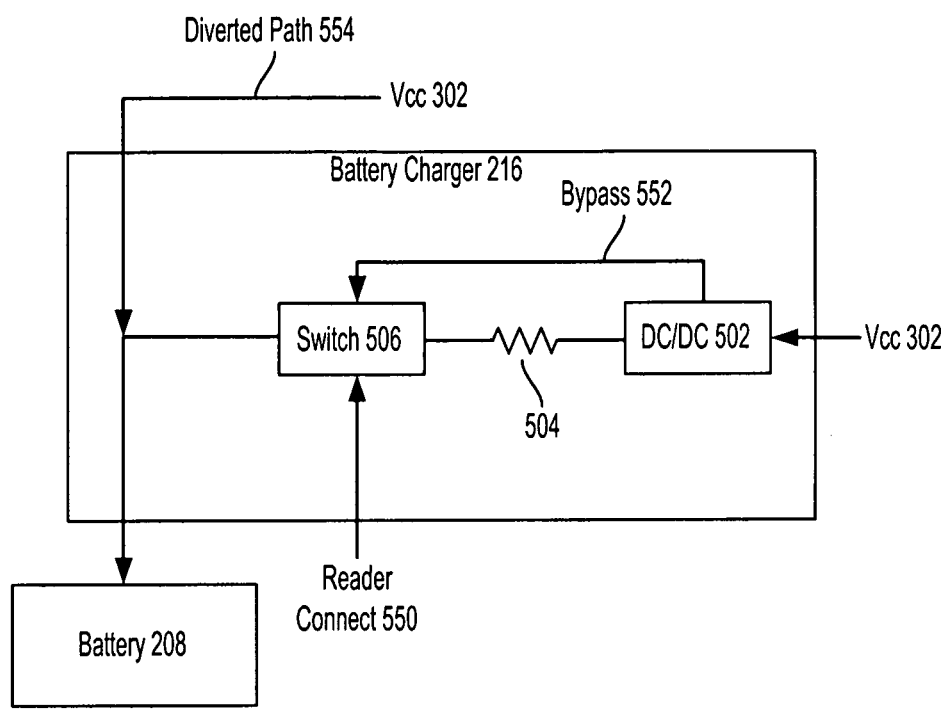
FIG. 5 is a diagram of an exemplary integrated battery charging device according to embodiments of the present disclosure.

The smart card device 102 also includes battery charger 216. The battery charger 216 is an element that includes hardware used to assist in charging the battery 208. An exemplary battery charger 216 is illustrated in FIG. 5, discussed in more detail below.

Returning to FIG. 1, the networked system environment 100 also includes the interface device 104. The interface device 104 may be, for example, a point-of-sale (POS) terminal that includes, either integrally or as a peripheral, an EMV reader. As another example, the interface device 104 may be a charging terminal. Although illustrated as a device within the networked system environment 100, the interface device 104 may alternatively be a stand-alone device that does not need to connect to one or more networks 106, e.g. where the interface device 104 is a charging terminal. Alternatively, where the interface device 104 is a charging terminal, it may still be capable of connecting with one or more networks 106 in order to transmit or receive data for the benefit of the interface device 104 and/or the smart card device 102.

Where the interface device 104 is a POS device, the interface device 104 may be configured to facilitate a purchase by a user of the smart card device 102 of goods or services. The interface device 104 may be configured to accept payment information from or on behalf of the user of the smart card device 102 through the processing server 108 over the network 106. In some embodiments, the interface device 104 may receive information from another device associated with the user of the smart card device 102 from some other source than the processing server 108, for example through NFC and/or a scanner. In some embodiments, the interface device 104 may receive information using a scanner, such as a bar code scanner, for scanning and/or reading optical machine-readable representations of data and/or images to begin a transaction for which the smart card device 102 will be used. In some embodiments, the interface device 104 may have or communicate with an imaging device that may capture images of optical machine-readable representations of data.

In some examples, the interface device 104 may receive and process a payment confirmation from processing server 108 (e.g., where the processing server 108 operates as a payment provider server), as well as transmit transaction information to the processing server 108 and receive information from the processing server 108 (e.g., a transaction ID). The interface device 104 may also be configured to receive payment via a plurality of other, alternative payment methods including cash, credit cards, debit cards, checks, money orders, and/or the like. In some embodiments, the interface device 104 may also have a wireless charging device for wirelessly charging devices, such as a user device (e.g., a phone and/or the smart card device 102), for when devices are under powered and/or lack sufficient battery power/charge to function.

The interface device 104 may be maintained, for example, by a merchant, seller, or a marketplace offering various products and/or services. The interface device 104 may be set up to handle payments at a brick and mortar store selling goods and/or services. For example, the interface device 104 may be set up for a grocery store, gas station, convenience store, department store, mall, clothing store, and/or the like, to name just a few examples. The interface device 104 may be in communication with and/or linked with a payment provider, such as the processing server 108, to conduct currency transfers when a product is purchased. Generally, the interface device 104 may be maintained by anyone or any entity that receives money, which includes charities as well as banks and retailers.

The system of the merchant/seller/etc. with which the interface device is associated may include a database with information regarding merchant and/or user accounts, and an inventory of products available for sale, donation, exchange, and/or the like. Products may include, but are not limited to, physical goods, digital goods, services, commodities, charities and/or the like (products may also be referred to as items). The database may contain product descriptions which may include textual descriptions of products, information regarding the merchant (e.g. merchant name, location, type, etc.), receipts for purchases, and/or the like.

The networked system environment 100 may also include the network 106. The network 106 may be implemented as a single network or a combination of multiple networks. For example, in various embodiments, the network 106 may include the Internet and/or one or more intranets, landline networks, wireless networks, and/or other appropriate types of networks. The interface device 104 (and, in some embodiments, the smart card device 102) may be implemented using any appropriate combination of hardware and/or software configured for wired and/or wireless communication over network 106.

The networked system environment 100 also includes the processing server 108. In an embodiment, the processing server 108 may include a transceiver, a memory, a processor, and a database, to name some examples. These elements may be in direct or indirect communication with each other, for example via one or more buses. The processing server 108 may be maintained, for example, by an online payment service provider which may provide payment between a user of the smart card device 102 and the operator of the interface device 104, another user, and/or a merchant. The processing server 108 may include one or more payment applications which may be configured to interact with other systems and devices over the network 106.

The processing server 108 may also maintain a plurality of user accounts, each of which may include account information associated with consumers, merchants, and funding sources, such as banks and/or credit card companies. For example, account information may include private financial information of users of smart card devices 102 such as account numbers, passwords, device identifiers, user names, phone numbers, credit card information, bank information, place of residence, mailing addresses, shipping locations, and/or other information which may be used to facilitate transactions. One or more payment applications on the processing server 108 may be configured to interact with the interface device 104 (e.g., where the interface device 104 is a POS device) during a transaction with the interface device 104 to track and manage purchases made by users and track which funding sources are used. The payment application may be configured to determine the existence of, and to manage, existing accounts as well as create new accounts. The payment application may be configured to execute one or more payment transactions in response to receiving and/or recognizing a purchase request from the interface device 104.

The processing server 108 may also include a transaction processing application, which may be part of or separate from the payment application. The transaction processing application may be configured to receive information from the interface device 104 for processing and storage in a database. The transaction processing application may include one or more applications for processing payment information from the interface device 104 using various selected funding instruments. As such, the transaction processing application may store details of an order from individual users, including a funding source used, available credit options, and/or the like. The transaction processing application may be configured to execute one or more transactions in response to a user purchasing a product through the interface device 104 using the smart card device 102.

In some embodiments, the processing server 108 may be maintained by a payment service provider, such as PayPal, Inc. of San Jose, Calif. A user may utilize the smart card device 102 to initiate a payment transaction at the interface device 104, receive a transaction approval request at the interface device 104, and/or reply to a transaction approval request. As used herein, transaction may refer to any suitable action performed using the smart card device 102, including payments, transfer of information, display of information, purchases, sales, online listings, charging of the battery of the smart card device 102, and/or the like.

Although illustrated as a single server, the processing server 108 may include or implement a plurality of servers and/or software components that operate to perform various methodologies in accordance with the described embodiments. Exemplary servers may include, for example, stand-alone and enterprise-class servers operating a server OS. It can be appreciated that the server illustrated in FIG. 1 may be deployed in other ways and that the operations performed and/or the services provided by such server(s) may be combined or separated for a given implementation and may be performed by a greater number or fewer number of servers. One or more servers may be operated and/or maintained by the same or different entities.

The smart card device 102 may interact with the interface device 104 to accomplish one or more objectives, ranging from charging the battery 208 of the smart card device 102 alone, initiating and/or completing a transaction (e.g., a purchase transaction via the interface device 104 and the processing server 108) alone, or charging the battery 208 and completing a transaction, to name just a few examples.

In one example the interface device 104 may be a charging device with functionality limited to charging (whether physically limited with no ability to conduct a purchase transaction or capable of a purchase transaction and artificially limited for this purpose at a given time, e.g. due to the time of day of the attempt, etc.). When the smart card device 102 is inserted into the interface device 104 (or brought within proximity of it for wireless communication, such as to charge via induction), the interface device 104 may detect the presence of the smart card device 102. When limited to charging, the interface device 104 may, in addition to providing an input voltage via the Vcc contact 302, assert a proprietary signal that the smart card device 102 receives via its proprietary/standard contact 312. Assertion of the proprietary signal (and of other signals) may be achieved in some embodiments by driving the voltage on the contact toward ground, while in other embodiments it may be achieved by driving the voltage to a standard voltage, depending upon the particular configuration of the devices.

Asserting the proprietary signal at the proprietary/standard contact 312 may indicate to the smart card device 102 that the interface device 104 is only capable of charging the battery 208 of the smart card device 102 (whether at all or simply at that time). In response to this asserted signal, the smart card device 102 may respond by the battery charger 216 diverting the input voltage from the Vcc contact 302 to the battery 208 without powering any other components (or some subset) of the smart card device 102. Further, assertion of the signal at the proprietary/standard contact 312 may be taken by the smart card device 102 as an indication that the voltage level of the voltage input at Vcc contact 302 is already at a level appropriate for charging the battery 208 without further regulation necessary (e.g., 5V). For example, the processor 210 may interpret the asserted signal at the proprietary/standard contact 312 as an interrupt and divert current directly to the battery 208. Charging of the battery 208 may then occur for some period of time, e.g. until the battery is charged fully, for a fixed period of time based on a set time limit or time of day, until the charge remaining rises above a predetermined threshold, etc.

In another example, the interface device 104 is a POS terminal that is prepared to do more than charge the smart card device 102 (e.g., engage in a purchase transaction or other type of transaction alone or in combination with charging the smart card device 102). When the smart card device 102 is inserted into the interface device 104 (or brought within proximity of it for wireless communication, such as to charge via induction), the interface device 104 may detect the presence of the smart card device 102. When not limited to charging, the interface device 104 may, in addition to providing an input voltage via the Vcc contact 302, leave the proprietary signal at the proprietary/standard contact 312 unasserted (e.g., floating where assertion corresponds to driving the voltage on the contact toward ground).

In response to detecting that the proprietary/standard contact 312 is floating at the interface device 104, the processor 210 may divert current to a voltage regulator to regulate the voltage to either boost or buck it to what the battery 208 needs for charging. Further, the processor 210 may divert a fraction of the current to the voltage regulator while a transaction is otherwise occurring or alternatively may deactivate elements of the smart card device 102 until charging is complete (or, alternatively, has exceeded a predetermined charging threshold) and then re-activate the elements so that the smart card device 102 may be read/a transaction may be completed. As a result, according to embodiments of the present disclosure the battery 208 of the smart card device 102 may, upon removal from the interface device 104 (e.g., at the completion of a transaction) have more charge than before. Thus, the more the smart card device 102 is used for transactions, the more opportunities it has to charge itself and increase its useful life.

Figure 4:
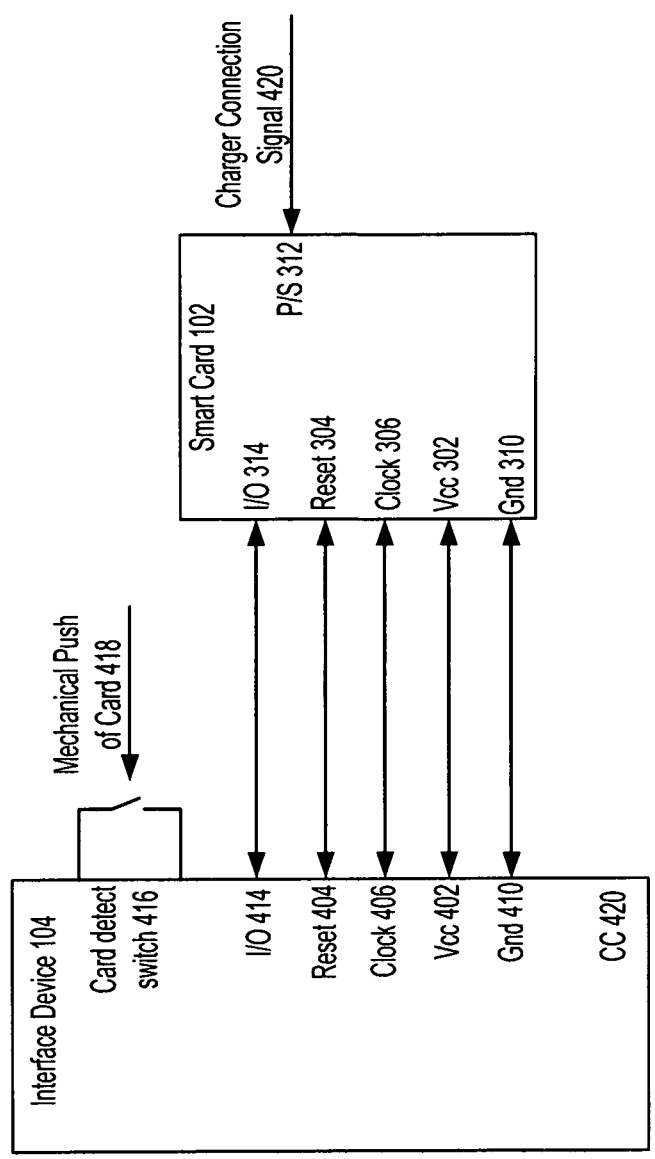
FIG. 4 is a diagram of an exemplary interface between an interface device and a smart card device according to embodiments of the present disclosure.

Turning now to FIG. 4, a diagram of an exemplary interface between an interface device 104 and a smart card device 102 is illustrated according to embodiments of the present disclosure.

As the smart card device 102 is inserted into an interface device 104, the contacts of the EMV chip 204 come into contact with corresponding contacts on the interface device 104. As shown in FIG. 4, at the interface device 104 a card detect switch 416 may detect the insertion of a smart card device 102 after a push 418 causes the card detect switch 416 to close. In alternative embodiments, for example where the smart card device 102 interfaces with the interface device 104 via a contactless standard, the card detect switch 416 may instead take the form of a field detection monitor that identifies the smart card device 102 based on a change in one or more fields (e.g., magnetic field) surrounding the interface device 104.

Once inserted into the interface device 104, the smart card device 102 interfaces with the interface device 102 as illustrated. The Vcc contact 302 of the smart card device 102 connects with a Vcc output contact 402 at the interface device 104, through which the interface device 104 provides voltage at a current to the smart card device 102. The reset contact 304 of the smart card device 102 connects with a reset contact 404 at the interface device 104. The clock contact 306 connects with a clock contact 406 at the interface device 104, the ground contact 310 connects with a ground contact 410 at the interface device 104, and the input/output contact 314 connects with an input/output contact 414 at the interface device 104. These interfaced contacts then convey one or more signals between the devices, for example in pre-determined patterns to effectuate pre-determined results (e.g., power-up routines, data transfer routines, reset routines, power-down routines, etc.).

In some embodiments, the interface device 104 also outputs a charger connection signal 420 from a contact on the interface device 104 which connects with the proprietary/standard contact 312 of the smart card device 102. The interface device 104, where it includes a contact for this signal, may either assert the charger connection signal 420 or leave it floating, depending upon the use case as described above with respect to FIG. 1 and further below with respect to one or more subsequent figures.

FIG. 5 is a diagram of an exemplary integrated battery charging device, for example the battery charger 216 of FIG. 2, according to embodiments of the present disclosure. As shown in FIG. 5, the battery charger 216 includes a DC/DC converter 502, current limiter 504, and a switch 506. These elements may be connected to each other and the battery 208, for example via traces or other types of charge carrier. The battery charger 216 assists in charging the battery 208 when the smart card device 102 is inserted into an interface device 104 configured according to embodiments of the present disclosure. Generally, the battery charger 216 assists the smart card device 102 in detecting an incoming voltage from the interface device 104 (e.g., via Vcc contact 302) and regulating the voltage to a standard input voltage that the smart card device 102 can use in charging the battery 208.

Regulating the voltage may include either boosting or bucking the voltage to arrive at the desired voltage level(s). For example, the smart card device 102 may operate at a class A voltage (e.g., 5V), a class B voltage (e.g., 3V), or a class C voltage (e.g., 1.8V) to name just a few examples. If the incoming voltage from Vcc contact 302 goes outside of minimum or maximum values (e.g., those established according to one or more standards), the DC/DC converter 502 may be switched off and the smart card device 102 powered down in order to prevent damage to the components of the smart card device 102.

Once the smart card device 102 interfaces with the interface device 104 (e.g. as illustrated in FIG. 4), with the contacts of the smart card device (e.g., of EMV chip 204) in contact with corresponding contacts at the interface device 104, one or more signals are transferred between the devices. For example, the Vcc contact 302 begins receiving a voltage provided from the Vcc contact 402 of the interface device 104 that powers the smart card device 102, e.g. in order to complete a transaction. The voltage may be routed to the battery charger 216 and input to the battery charger 216 so that the DC/DC converter 502 receives the input and/or via the diverted path 554 which bypasses the DC/DC converter 502. In an embodiment, the voltage is routed to the battery charger 216 in addition to other discrete elements of the smart card device 102, while in another embodiment the battery charger 216 may operate as a gateway for the voltage from the interface device 104 both to the battery 208 and the rest of the elements of the smart card device 102 (so that the voltage reaches the battery charger 216 first before other elements).

As illustrated in FIG. 5, the input voltage from the Vcc contact 302 may be directly input to the battery 208 via the diverted path 554, through DC/DC converter 502 and current limiter 504 to the battery 208 via the switch 506, or by the bypass 552 to the battery 208 via the switch 506. The particular route used to charge the battery 208 in any given circumstance may be governed, at least indirectly, by the status of the proprietary/standard contact 312, as will be discussed in more detail below.

In an embodiment, the smart card device 102 may be inserted into a charging terminal (e.g., the interface device 104 is a charging terminal that either is capable of POS transactions but is not doing so at this time or is not capable of POS transactions generally, to name some examples). In an embodiment, the charging terminal asserts the charger connection signal 420 (described above with respect to FIG. 4, e.g. by driving the voltage on the contact toward ground, while in other embodiments by driving the voltage to a standard voltage).

The processor 210 of the smart card device 102, recognizing that the charger connection signal 420 is asserted at the proprietary/standard contact 312 (e.g., not left floating), interprets this as an interrupt and de-asserts the reader connect signal 550 that is input to the switch 506. De-assertion of the reader connect signal 550 (whether that corresponds to a logical high or low value) results in the switch 506 deactivating (switching open). With the switch 506 open, the path via the DC/DC converter 502 is interrupted and the input voltage from the Vcc contact 302 is diverted to the battery 208 via the diverted path 554. In an embodiment, the diverted path 554 is itself activated in response to recognition of the charger connection signal 420 being asserted at the proprietary/standard contact 312 (and de-activated when the charger connection signal 420 is not asserted, discontinuing voltage/current along the diverted path 554). The battery 208 is recharged with this input voltage along the diverted path 554. In this embodiment, the battery 208 may be charged via the diverted path 554 because assertion of the signal at the proprietary/standard contact 312 is an indication to the smart card device 102 that the voltage at the Vcc contact 302 will be within the appropriate range (e.g. 4.2V-5V as an example) to charge the battery 208 without further conditioning—the smart card device 102 may "trust" the voltage and current to be set appropriately.

In embodiments where the interface device 104 cannot be "trusted" to output the correct voltage/current characteristics at the Vcc contact 302, e.g. is not a dedicated charging terminal, additional regulation may become necessary. For example, the smart card device 102 may be inserted into a POS terminal (e.g., the interface device 104 is an EMV reader of a POS terminal). In the embodiment, the POS terminal does not assert a charger connection signal 420 (e.g., the POS terminal instead leaves the charger connection signal at the proprietary/standard contact 312 floating).

The processor 210 of the smart card device 102, recognizing that the charger connection signal 420 is left floating at the proprietary/standard contact 312 (e.g., not asserted), asserts the reader connect signal 550 that is input to the switch 506. Assertion of the reader connect signal 550 (whether that corresponds to a logical high or low value) results in the switch 506 activating (switching closed). With the switch 506 closed, the path via the DC/DC converter 502 becomes open and the input voltage from the Vcc contact 302 is diverted to the battery 208 via the DC/DC converter 502 instead of the diverted path 554. In an embodiment, the diverted path 554 may be de-activated in response to recognition of the charger connection signal 420 floating at the proprietary/standard contact 312 (e.g., opened so that voltage/current is not available from the Vcc contact 302 via the diverted path 554).

Upon entering the DC/DC converter 502, the input voltage from the Vcc contact 302 may be stepped up or down, as necessary, in order to arrive at the proper voltage for charging the battery 208. For example, the input voltage may be at class A voltage (e.g., 5V), class B voltage (e.g., 3V), or class C voltage (e.g., 1.8V) to name just a few examples. Other voltage values may be used as well. In embodiments where the input voltage is at the class A voltage (approximately 5V), the DC/DC converter 502 may have the input voltage bypass the converter 502 and the current limiter 504 via the bypass 552 to the switch 506. With the switch 506 activated (closed), the path to the battery 208 via the switch 506 is closed and therefore the input voltage is connected to the battery 208 via the switch 506, charging the battery 208.

In embodiments where the input voltage is at some other value (e.g., class B 3V or class C 1.8V) the DC/DC converter 502 regulates the input voltage to a range appropriate to charge the battery 208 (e.g., 4.2V). The regulated voltage is output from the DC/DC converter 502 and the corresponding current is then regulated by the current limiter 504 (e.g., to 4 mA as just one example). After regulating the voltage and current to target values, the regulated voltage reaches the switch 506. With the switch 506 activated (closed), the path to the battery 208 via the switch 506 is closed and therefore the regulated voltage is connected to the battery 208 via the switch 506, charging the battery 208. As a result, the voltage (and current) is at an appropriate value to charge the battery 208 irrespective of the input voltage (e.g., according to any class) at the Vcc contact 302.

According to some embodiments of the present disclosure, the smart card device 102 and/or the interface device 104 may further control the manner/timing in which the battery 208 may be charged. For example, the smart card device 102 may only allow charging of its battery 208 at certain times of day, for example according to a time of day that the interface device 104 provides to the smart card device 102 upon appropriate interfacing between the two (whether contact or contactless). The enforcement may be by the smart card device 102, for example by the processor 210 not allowing any current to be diverted to the battery 208 if the time provided is outside a pre-determined range (e.g., according to a pre-programmed schedule). This may also or alternatively include the processor 210 only allowing charging to occur for a fixed period of time while the smart card device 102 is interfaced with the interface terminal 104.

As another example, the smart card device 102 may only allow charging of its battery 208 based on one or more future predicted activities for the smart card device 102. This may be predicted by the smart card device 102's processor based on a tracked pattern of prior use (whether tracked by the processor 210 or by some external unit, such as the processing server 108) or based on some input via the display 214 (where input is supported). As another example, the length of a line may influence the smart card device 102's determination on whether to permit charging of the battery 208 or not (e.g., via an input indicating a line has been joined, such as for checking out/a purchase transaction).

As another example, the processor 210 may track the remaining charge of the battery 208 as compared to a target total charge (e.g., according to manufacturer's specification). When the smart card device 102 interfaces with an interface terminal 104, the processor 210 may first determine a percentage of total charge remaining and, based on a comparison to a charge threshold, determine whether to permit charging. For example, the processor 210 may not allow the battery charger 216 to cause the battery 208 to be charged unless/until the percentage of charge remaining falls below a threshold, which may occur before or during a transaction at the interface device 104. Further, the processor 210 may stop charging of the battery 208 after the percentage remaining rises above another threshold (whether that is the target charge amount or some value below or above that) and/or after a fixed period of time of charging has passed (e.g., the battery 208 has been charged for a fixed period of time already).

Figure 6:
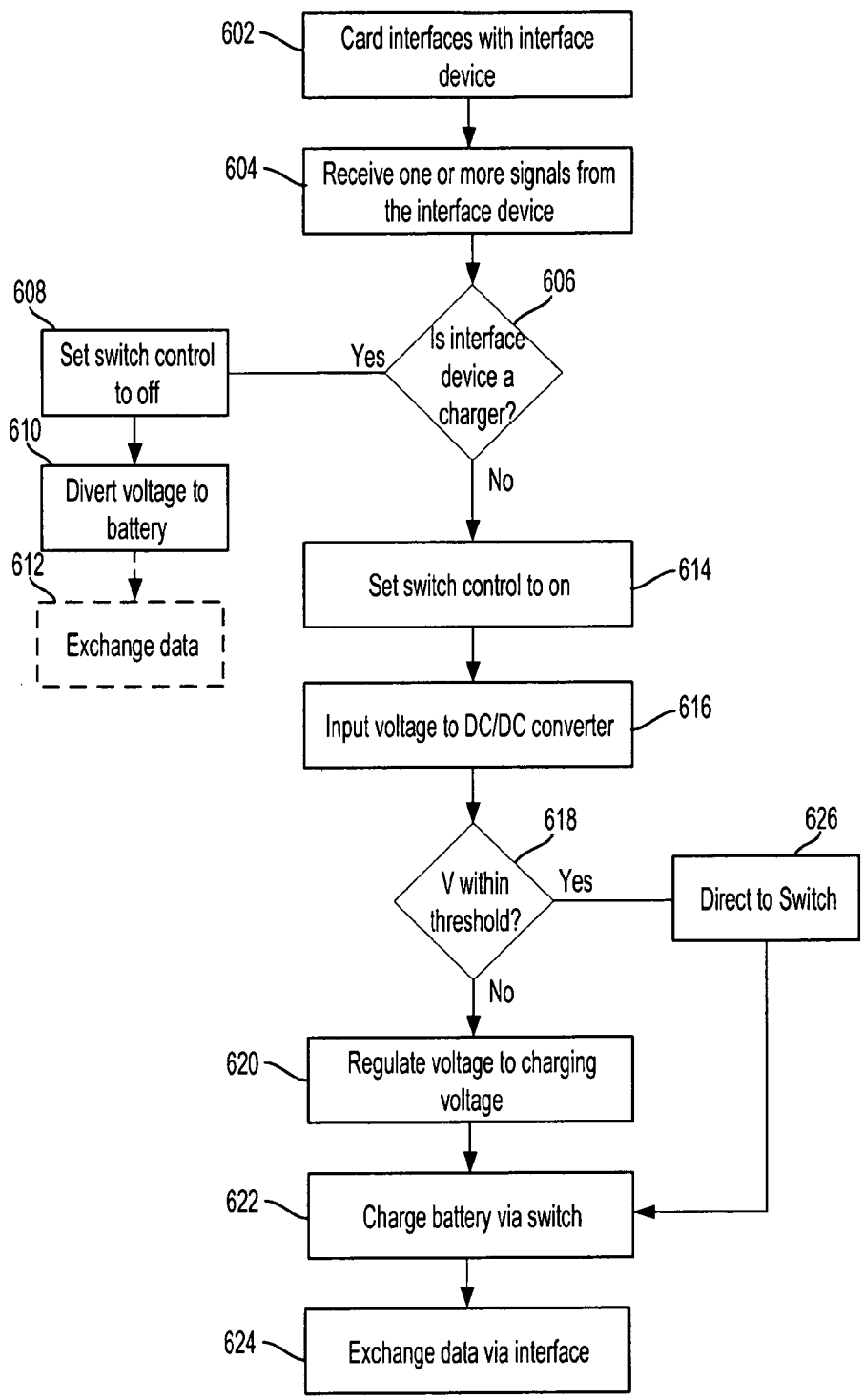
FIG. 6 is a flow diagram illustrating an embodiment of a method for utilizing an interface device to charge a battery of a smart card device according to an embodiment of the present disclosure.

FIG. 6 is a flow diagram illustrating an embodiment of a method 600 for utilizing an interface device to charge a battery of a smart card device according to an embodiment of the present disclosure. For example, the interface device may be interface device 104 (e.g., either a charging terminal or an EMV reader as two examples) and the smart card device may be smart card device 102, as discussed with respect to the embodiments above. The method 600 will be described with respect to a specific smart card device 102 (and interface device 104) for simplicity of discussion, though it will be recognized that the aspects described herein may be applicable to a plurality of smart card devices 102 (and interface devices 104). It is understood that additional steps can be provided before, during, and after the steps of method 600, and that some of the steps described can be replaced or eliminated for other embodiments of the method 600.

At block 602, the smart card device 102 interfaces with the interface terminal 104, for example by physical contact (e.g., the contacts of the EMV chip 204) or contactless (e.g., Near Field Communications or other radio frequency connection).

At block 604, the smart card device 102 receives one or more signals from the interface device 104, for example an input voltage via Vcc contact 302, a clock signal via clock contact 306, a reset signal via the reset contact 304, ground via the ground contact 310, input/output data via the input/output contact 314, and potentially a proprietary signal (such as the charger connection signal 420) via the proprietary/standard contact 312, to name a few examples.

If the interface device 104 is a charging terminal specifically, then at decision block 606 the method 600 proceeds to block 608. The smart card device 102 may determine, at decision block 606, that the interface device 104 is a charging terminal specifically based on the status of the signal at the proprietary/standard contact 312. If asserted, then the smart card device 102 determines that the interface device 104 is a charging terminal.

At block 608, the smart card device 102 sets a switch control signal to a value that deactivates the switch 506 in the battery charger 216 and, in some embodiments, activates the diverted path 554. For example, as described above with respect to FIG. 5 the processor 210 may de-assert the reader connect signal 550.

At block 610, as a result of deactivation of the switch 506 and activation of the diverted path 554, the smart card device 102 diverts input voltage from the interface device 104 (intended to power other components of the smart card device 102) to the battery 208, thereby charging the battery 208 (e.g., either to the exclusion of other operations or in conjunction with other operations within the smart card device 102).

At optional block 612, the smart card device 102 may exchange data with the charging terminal (interface device 104), whether that data involves a transaction or some other objective. The exchange of data may occur concurrent to the charging of the battery 208 or, alternatively, may occur after the battery 208 has completed charging (or before charging begins).

Returning now to decision block 606, if the smart card device 102 determines that the interface device 104 is an EMV reader (or POS terminal, or POS terminal with EMV reader, for example), the method 600 proceeds instead to block 614. The smart card device 102 may determine, at decision block 606, that the interface device 104 is an EMV reader specifically based on the status of the signal at the proprietary/standard contact 312. If left floating, then the smart card device 102 determines that the interface device 104 is an EMV reader of some sort.

At block 614, the smart card device 102 sets the switch control signal to a value that activates the switch 506 in the battery charger 216 and, in some embodiments, deactivates the diverted path 554. For example, as described above with respect to FIG. 5 the processor 210 may assert the reader connect signal 550 which causes the switch 506 to close.

At block 616, the input voltage from the interface device 104 is input to a DC/DC converter, such as the DC/DC converter 502 of FIG. 5.

If the input voltage at the DC/DC converter 502 is not within a pre-specified threshold range at decision block 618, e.g. 4.2V-5V, then the method 600 proceeds to block 620. The DC/DC converter 502 may include a comparator to make this determination.

At block 620, the DC/DC converter 502 regulates (e.g., by either boosting or bucking) the input voltage to an output voltage suitable for charging the battery 208, e.g. 4.2V. The current may also be regulated before charging the battery 208. As a result, a voltage (and current) may be produced (and/or current limited) suitable for charging the battery 208, regardless of the input voltage level from the interface device 104.

At block 622, the regulated voltage (current) charges the battery 208 via the closed (activated) switch 506. As described above, this charging may be done without restriction or, alternatively, according to one or more restrictions imposed.

At block 624, the smart card device 102 exchanges data with the interface device 104 via the input/output contact 314 (or via the contactless interface, where appropriate). This exchange of data may occur concurrently with the charging of the battery 208 or, alternatively, after the charging is completed (or before, in some embodiments).

Returning to decision block 618, if the input voltage at the DC/DC converter 502 is within the pre-specified threshold range, then the method 600 proceeds to block 626 where the input voltage is routed to the switch 506 via a bypass path 552. This may occur, for example, where the voltage is already at the target charging range for the battery 208 (e.g., a 5V input voltage). After bypassing to the switch 506, the method 600 may then proceed as described above with respect to blocks 622 and 624.

Figure 7:
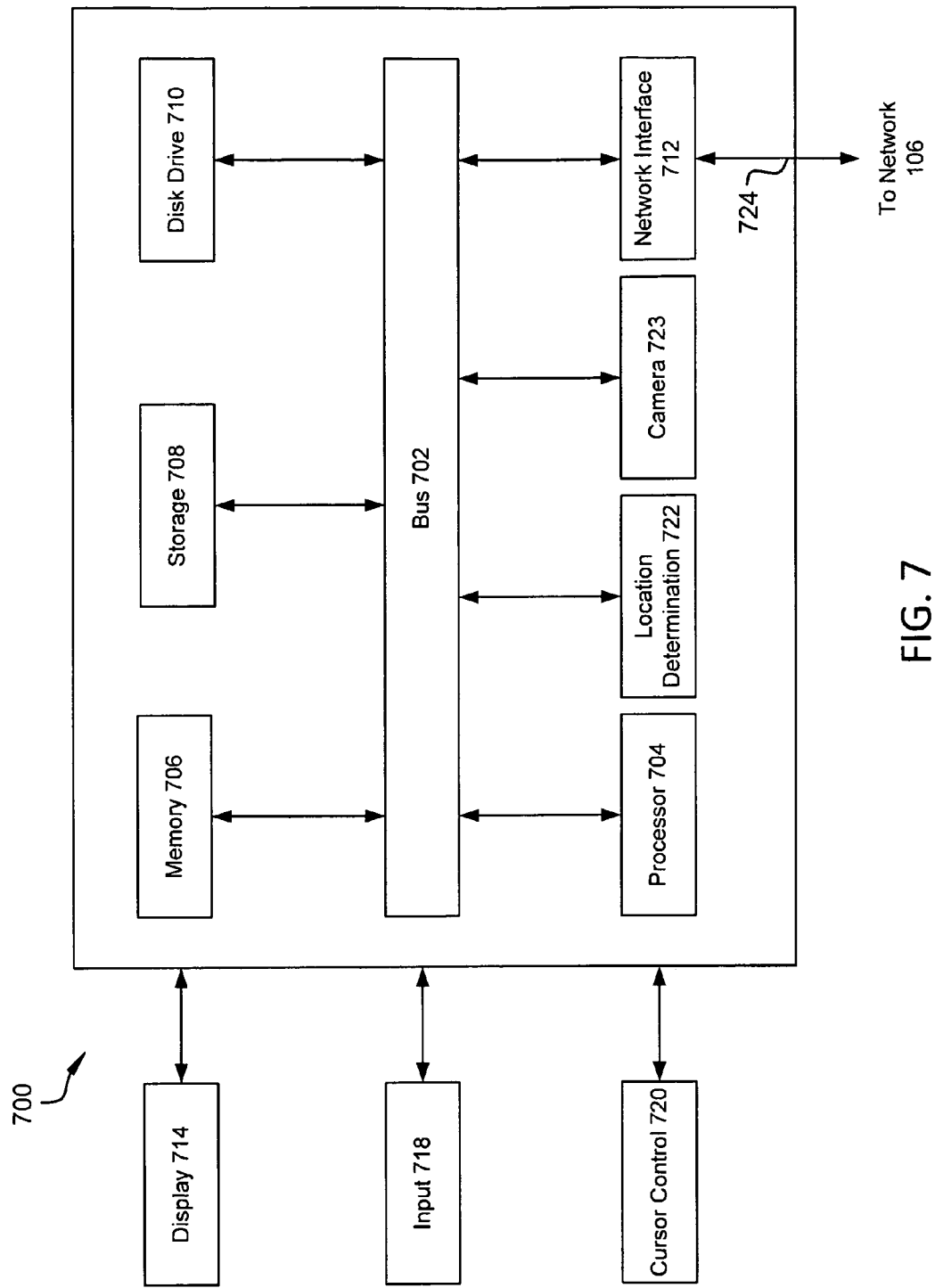
FIG. 7 is a schematic view illustrating an embodiment of a computer system.

Referring now to FIG. 7 an embodiment of a computer system 700 suitable for implementing, for example, the smart card devices, servers, interface devices (e.g. POS devices, EMV readers, charging terminals), etc., is illustrated. It should be appreciated that other devices utilized by users, payment service providers, point of sale operators, and/or merchants/stores in the system discussed above may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), a location determination component 722, and/or a camera component 723. In one implementation, the disk drive component 710 may comprise a database having one or more disk drive components.

In accordance with embodiments of the present disclosure, the computer system 700 performs specific operations by the processor 704 executing one or more sequences of instructions contained in the memory component 706, such as described herein with respect to the smart card devices, interface devices, and/or processing server devices. Such instructions may be read into the system memory component 706 from another computer readable medium, such as the static storage component 708 or the disk drive component 710. In other embodiments, hard-wired circuitry may be used in place of or in combination with software instructions to implement the present disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 700. In various other embodiments of the present disclosure, a plurality of the computer systems 700 coupled by a communication link 724 to the network 106 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A smart card device, comprising:
   a plurality of interface contacts;
   a battery device configured to power an electronic component of the smart card device;
   a battery charging device configured to charge the battery device;
   a non-transitory memory storing instructions; and
   one or more hardware processors coupled to the plurality of interface contacts, the battery charging device, and the non-transitory memory;
   wherein the smart card device includes stored logic executable to cause the smart card device to perform operations comprising:
      detecting a status of a dedicated input signal received from an interface device, via a contact from among the plurality of interface contacts, after at least one contact from among the plurality of interface contacts come in contact with the interface device; and
      directing the battery charging device to divert, from the interface device based the detected status of the dedicated input signal, an input voltage from the interface device to the battery device,
      wherein the battery device charges from the diverted input voltage;
   wherein the operations further comprise:
      determining a charge amount remaining in the battery device; and
      initiating the diversion of the input voltage to the battery device in response to the determined charge amount remaining in the battery being at or below a predetermined threshold.

2. The smart card device of claim 1, wherein the battery charging device further comprises:
   a voltage regulator configured to regulate the input voltage to a target voltage, the voltage regulator being along a path between the interface device and the battery device; and
   a switch comprising activated and deactivated states corresponding to a status of a switch control signal.

3. The smart card device of claim 2, wherein the operations further comprise:
   determining that the dedicated input signal has a first status corresponding to the interface device comprising a charging device; and
   outputting the switch control signal having a first status to place the switch in the deactivated state based on the determined first status,
   wherein the switch in the deactivated state, based on the determined first status and the deactivated switch, diverts the input voltage from the battery charging device to the battery device without accessing the voltage regulator.

4. The smart card device of claim 2, wherein the operations further comprise:
   determining that the dedicated input signal has a second status corresponding to the interface device comprising a card reader; and
   outputting the switch control signal having a second status to place the switch in the activated state based on the determined second status,
   wherein the switch in the activated state, based on the determined second status of the dedicated input signal and the second status of the switch control signal, diverts the input voltage to the voltage regulator before reaching the battery device to charge the battery device with the regulated input voltage.

5. The smart card device of claim 1, wherein:
   the plurality of interface contacts further comprises an input/output contact, and
   the operations further comprise exchanging data via the input/output contact.

6. The smart card device of claim 5, wherein the operations further comprise:
   deactivating, in response to the plurality of interface contacts coming in contact with the interface device and prior to exchanging the data, one or more components of the smart card device while the battery device is charged, and
   activating, in response to completion of the battery device charging, the one or more components of the smart card device to complete the exchange of the data with the interface device.

7. The smart card device of claim 1, wherein the instructions stored on the non-transitory memory comprise the stored logic executable by the smart card device.

8. A method for charging a smart card device, comprising:
detecting, after insertion of the smart card device into an interface device, a status of a dedicated input signal from the interface device;
determining a charge amount remaining in a battery of the smart card device;
diverting, from the interface device based on a detected status of the dedicated input signal, an input voltage from the interface device to the battery of the smart card device during at least a portion of a time period that the smart card device is inserted in the interface device, wherein initiating the diverting of the input voltage to the battery is performed in response to determining the charge amount remaining in the battery is at or below a predetermined threshold; and
charging the battery of the smart card device from the diverted input voltage during the at least portion of the time period.

9. The method of claim 8, further comprising:
determining that the dedicated input signal has a first status corresponding to the interface device comprising a charging device;
deactivating a switch along a path between the interface device and the battery comprising a voltage regulator based on the determined first status; and
diverting, based on the determined first status and the deactivated switch, the input voltage from the charging device to the battery without accessing the voltage regulator.

10. The method of claim 8, further comprising:
determining that the dedicated input signal has a second status corresponding to the interface device comprising a card reader;
activating a switch along a path between the card reader and the battery, the path comprising a voltage regulator; and
diverting, based on the determined second status and the activated switch, the input voltage to the voltage regulator before reaching the battery.

11. The method of claim 10, further comprising:
regulating the input voltage to a target voltage; and
charging the battery with the regulated input voltage via the switch.

12. The method of claim 11, further comprising:
regulating a current associated with the input voltage to a target current.

13. The method of claim 8, further comprising:
exchanging data between the interface device and the smart card device.

14. The method of claim 13, further comprising:
deactivating a processor of the smart card device upon detection of insertion of the smart card device into the interface device, and prior to the exchanging the data, while the battery is charged; and
reactivating the processor in response to completion of the battery charging to complete the exchanging the data.

15. The method of claim 8, wherein the smart card device includes an EMV chip.

16. A non-transitory machine-readable medium having stored thereon machine-readable instructions executable to cause a machine to perform operations comprising:
detecting insertion of a machine comprising a smart card device into an interface device and a status of a dedicated input signal from the interface device;
determining a charge amount remaining in a battery of the smart card device;
diverting, from the interface device based on a detected status of the dedicated input signal, an input voltage from the interface device to a battery of the smart card device while the smart card device is inserted in the interface device, wherein initiating the diverting of the input voltage to the battery is performed in response to the determined charge amount remaining in the battery being at or below a predetermined threshold; and
charging the battery of the smart card device from the diverted input voltage.

17. The non-transitory machine-readable medium of claim 16, wherein the operations further comprise:
determining that the dedicated input signal has a first status corresponding to the interface device comprising a charging device;
deactivating a switch along a path between the interface device and the battery comprising a voltage regulator based on the determined first status; and
diverting, based on the determined first status and the deactivated switch, the input voltage from the charging device to the battery without accessing the voltage regulator.

18. The non-transitory machine-readable medium of claim 16, wherein the operations further comprise:
determining that the dedicated input signal has a second status corresponding to the interface device comprising a card reader;
activating a switch along a path between the card reader and the battery, the path comprising a voltage regulator;
diverting, based on the determined second status and the activated switch, the input voltage to the voltage regulator before reaching the battery;
regulating the input voltage to a target voltage; and
charging the battery with the regulated input voltage via the switch.

19. The non-transitory machine-readable medium of claim 16, wherein the operations further comprise:
deactivating a processor of the smart card device upon detection of insertion of the smart card device into the interface device, and prior to exchanging data between the interface device and the smart card device, while the battery is charged;
reactivating the processor in response to completion of the battery charging; and
exchanging the data.

* * * * *